(No Model.) 2 Sheets—Sheet 1.
J. R. ALLGIRE & D. W. WILLIAMSON.
BARREL MACHINE.
No. 452,330. Patented May 12, 1891.
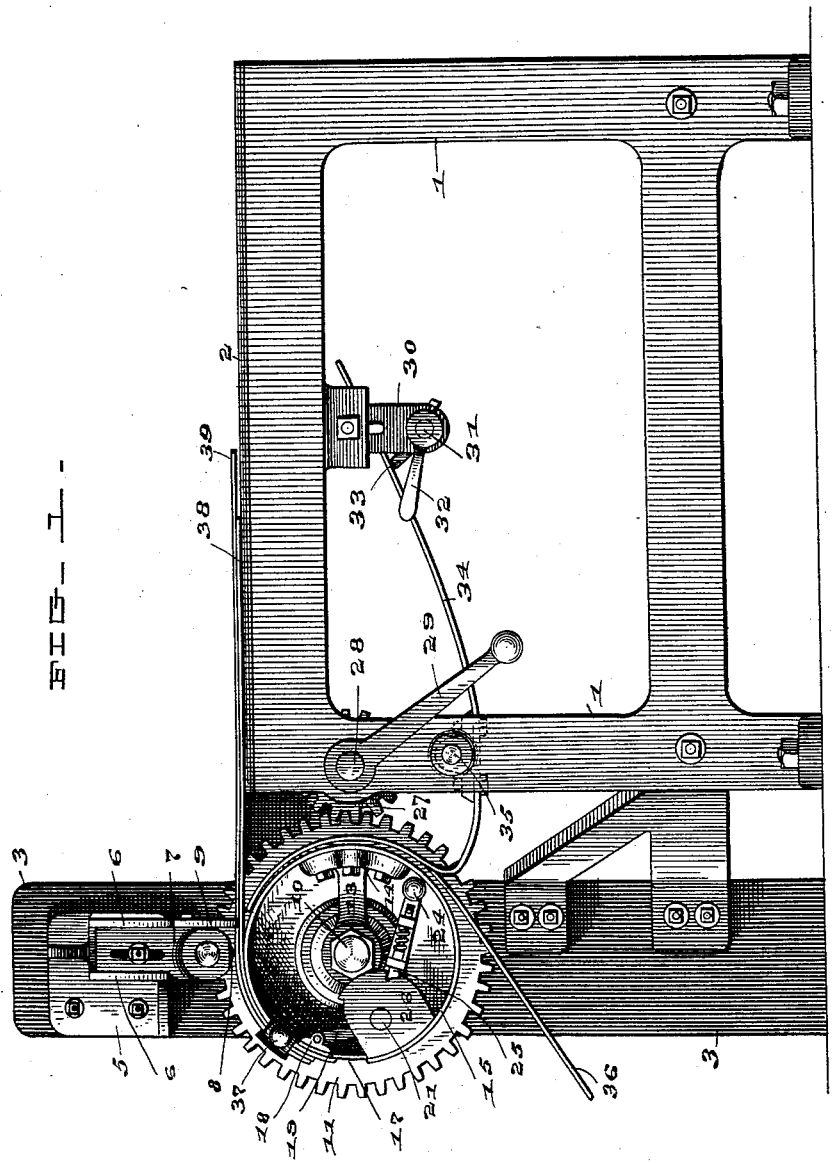
Witnesses
H. D. Nealy
O. B. Griffith
Inventors.
James R. Allgire
Dwight W. Williamson.
By their Attorney
O. P. Jacobs.

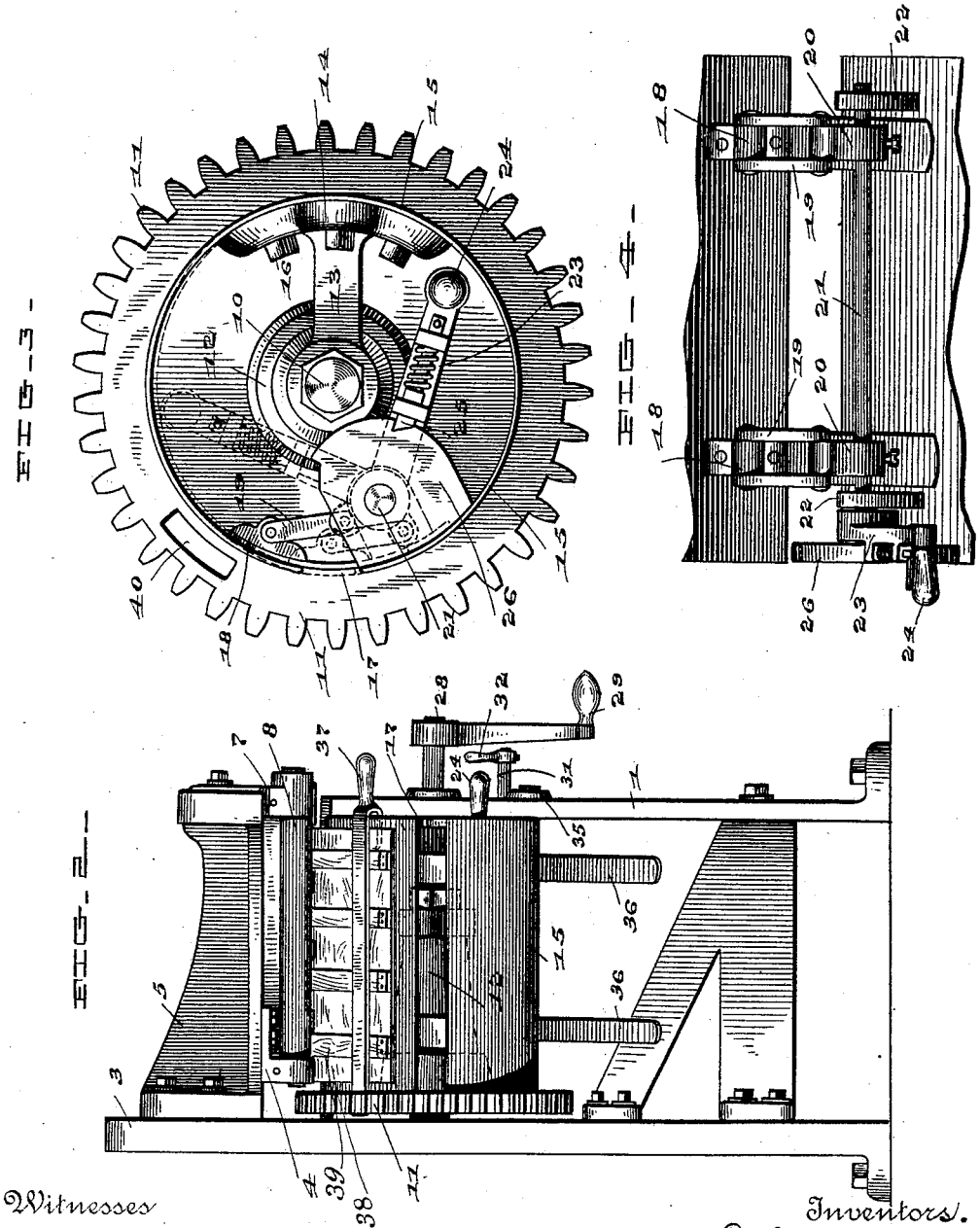

UNITED STATES PATENT OFFICE.

JAMES R. ALLGIRE AND DWIGHT W. WILLIAMSON, OF INDIANAPOLIS, INDIANA, ASSIGNORS TO ADAMS & WILLIAMSON, OF SAME PLACE.

BARREL-MACHINE.

SPECIFICATION forming part of Letters Patent No. 452,330, dated May 12, 1891.

Application filed December 17, 1890. Serial No. 375,026. (No model.)

*To all whom it may concern:*

Be it known that we, JAMES R. ALLGIRE and DWIGHT W. WILLIAMSON, both of Indianapolis, county of Marion, State of Indiana, have invented certain new and useful Improvements in Barrel-Machines; and we do hereby declare that the following is a full, clear, and exact description thereof, reference being had to the accompanying drawings, in which like letters refer to like parts.

Our invention relates to the construction of machines for forming barrels from a continuous sheet of veneer, wherein the latter, with its hoop-strips, is wound about a contractible drum, and it will be understood from the following description.

In the drawings, Figure 1 is a side elevation of the machine. Fig. 2 is an end view. Fig. 3 is an enlarged detail end view of the winding-drum and contracting mechanism. Fig. 4 is an inside elevation of the contracting device.

Referring to the drawings, 1 is a frame-work, having a table 2, upon which the material rests.

3 is an upright connected to the frame.

5 is a bracket, having flanges 6 on its end, in which moves an adjustable slide 7, carrying a pressure-roll 8, whose inner end is carried in a boxing 4, bolted beneath the bracket 5, and to the slide 7 and boxing 4 is bolted a guide-plate 9, having notches (these notches shown in dotted lines in Fig. 2) for guiding the hoop-strips and preventing their lateral displacement during the operation of winding.

10 is a shaft rigidly secured at one end to the upright 3. Upon this shaft is loosely mounted a spur-wheel 11, having a conical hub 12 and an arm 13 integrally connected to the hub, which has a foot 14, to which is secured the winding-drum 15 by bolts 16. This winding-cylinder is open at 17 to allow for its contraction; and 18 are lugs riveted to the drum, to which are pivoted links 19, whose opposite ends are pivoted in couplings 20, mounted on the rod 21, having bearings in ears 22 attached to the drum, and 23 is a crank having a handle 24, and provided with a spring-pawl 25, which engages with notches formed in the ratchet-block 26, also connected to the drum, as shown in Fig. 1. Two notches are shown in this ratchet-block; but more may be made, if desired.

27 is a small pinion mounted on a shaft 28, having bearings in the frame, and 29 is a crank for revolving this shaft.

30 are hangers adjustably bolted to projections beneath the frame providing bearings for the shaft 31, which has a crank or handle 32 for revolving it, and upon this shaft are formed levers 33, bearing against pressure-springs 34, which are bolted midway to a shaft 35, loosely set in the frame-work and passing onward, turning up in curves partly surrounding the drum, and between these springs and the drum the material passes as it is wound.

36 are downward continuations of these springs, forming a sort of narrowed chute to secure the entrance of the material into the passage between the curved part of the springs and the drum.

38 is a veneer sheet, which forms the body of the barrel, and 39 are the hoop-strips, of which four or more are commonly used. The frame-work of the machine is solidly bolted to the foundation or floor, as shown in Fig. 1.

The following is the manner in which our device operates: The sheet of veneer (if only one is used) is laid upon the table, the hoop-strips are set in proper relative position, and the end of the sheet, with the hoop-strips, is passed partly over the drum, the hoop-strips passing through the notches in the plate 9, and the outer end of both veneer and hoops is secured by means of the clamp-bar 37, the inner end of which passes through a hole 40 in the spur-wheel 11. The operator turns the crank 32 to the right, stiffening the springs 34, and bringing them up into operative position, as shown in Fig. 1. He then takes hold of the crank 29, revolving the shaft 28, and with it the small pinion 27 mounted thereon, its teeth engaging with those of the larger spur-wheel 11, revolving the latter and with it the attached drum 15, and the material is wound up about the body of the drum. As it proceeds its clamped end, with the hoops, passes up between the drum and the extensions 36 of the springs, and thence into the circular passage-way between the curved part of the springs 35 and the drum until the ends abut or slightly overlap at the top of the machine, and then stay-tacks or nails are driven through the ends of the hoops and the overlapping ends of the veneer sheets, holding the parts firmly together. The cylinder thus formed constitutes the body of the barrel and tightly hugs the periphery of the drum when the winding is completed.

To release the barrel-body from the drum, the operator takes hold of the handle of the pawl 25, releasing its latch from the notch in the ratchet-block 26, and throws it over to the front, allowing the end of the latch to engage with the forward notch in the ratchet-block. This operation drops the links 20 from the position shown in full lines to that shown in the dotted lines in Fig. 3, and pulls the open ends of the drum toward each other, narrowing the opening and decreasing the size of the drum, allowing the barrel-body to be readily drawn off. When this is done the pawl is thrown backward to engagement with the rear notch, as shown in the full lines in Fig. 3, and the drum is thus expanded to its normal size and ready for another operation.

What we claim as our invention, and desire to secure by Letters Patent, is the following:

1. In a barrel-machine, a frame-work, a spur-wheel mounted on an axle connected to such frame, a winding-drum secured to such spur-wheel so as to revolve with it and divided to allow its contraction, couplings connected to the adjacent ends of the drum, a rod carried in bearings in the drum at one side of this opening, a crank connected to such rod, provided with a spring-pawl engaging with teeth on a ratchet-block located below, whereby the revolution of the crank operates through the couplings to draw the ends of the drum-sheet toward each other, contracting its area, all combined substantially as shown and described.

2. In a barrel-machine, a frame-work, a winding-drum connected to a spur-wheel revolving upon an axle connected to the frame, a crank and pinion carried upon the frame and adapted to engage with and revolve the spur-wheel with its winding-drum, the latter divided at a point opposite its connection to the spur-wheel, and expanding mechanism composed of coupling-links pivoted at one end to the drum on one side of its opening and pivoted at the other end to collars mounted on a rod having a crank for revolving the same, whereby the links are drawn forward and the open ends of the drum-sheet drawn together, contracting its area, substantially as shown and described.

3. A barrel-machine comprising a frame-work, an axle secured thereto, a spur-wheel loosely mounted on such axle and revolved by a crank and pinion engaging therewith, a divided winding-drum rigidly secured at one side to an extension of the hub of such spur-wheel, couplings connected to the opposite ends of the drum-sheet and carried upon a revoluble rod having a crank provided with a spring-ratchet, whereby the ends of the drum-sheet may be drawn together for contracting its area, an adjustable slide located above the winding-drum, a pressure-roll journaled therein, a notched plate for permitting the passage of the hoop-strips connected to the veneer sheet that forms the barrel-body, and a clamping-bar for locking the end of the veneer sheet and hoops in place during the revolution of the drum, all combined substantially as shown and described.

4. A barrel-machine comprising a frame-work, a crank-and-pinion mechanism mounted upon a transverse shaft having bearings therein, a spur-wheel revoluble upon an axle connected to the frame-work beyond, its teeth engaging with those of the pinion, a divided winding-drum connected to the face of such spur-wheel, so as to allow its free ends to be drawn together, couplings pivoted to the drum-sheet at one side of its opening and connected to a rod having bearings in the opposite end of the drum-sheet, such rod provided with a crank for revolving the same, and a ratchet-and-pawl mechanism also connected thereto for locking the parts in place, in combination with springs extending partly about the periphery of the drum and below the same for guiding the material as it is wound about the drum, all combined substantially as shown and described.

In witness whereof we have hereunto set our hands this 11th day of December, 1890.

JAMES R. ALLGIRE.
DWIGHT W. WILLIAMSON.

Witnesses:
E. B. GRIFFITH,
H. D. NEVEY.